US011223710B2

(12) United States Patent
Cheng (10) Patent No.: US 11,223,710 B2
(45) Date of Patent: Jan. 11, 2022

(54) HINGE OF A MOBILE TERMINAL HAVING AN INWARD-FOLDABLE FLEXIBLE SCREEN AND A MOBILE TERMINAL HAVING AN INWARD-FOLDABLE FLEXIBLE SCREEN

(71) Applicant: Hangzhou Amphenol Phoenix Telecom Parts Co., Ltd., Zhejiang (CN)

(72) Inventor: Guanlun Cheng, Zhejiang (CN)

(73) Assignee: HANGZHOU AMPHENOL PHOENIX TELECOM PARTS CO., LTD., Hangzhou (CN)

( * ) Notice: Subject to any disclaimer, the term of this patent is extended or adjusted under 35 U.S.C. 154(b) by 30 days.

(21) Appl. No.: 16/960,255

(22) PCT Filed: Jan. 7, 2019

(86) PCT No.: PCT/CN2019/070604
§ 371 (c)(1),
(2) Date: Jul. 6, 2020

(87) PCT Pub. No.: WO2019/134696
PCT Pub. Date: Jul. 11, 2019

(65) Prior Publication Data
US 2021/0067614 A1 Mar. 4, 2021

(30) Foreign Application Priority Data

Jan. 8, 2018 (CN) .......................... 201820025344.1

(51) Int. Cl.
*G06F 1/16* (2006.01)
*H04M 1/02* (2006.01)

(52) U.S. Cl.
CPC .......... *H04M 1/022* (2013.01); *G06F 1/1616* (2013.01); *G06F 1/1652* (2013.01); *G06F 1/1681* (2013.01); *H04M 1/0268* (2013.01)

(58) Field of Classification Search
CPC .... G06F 1/1616; G06F 1/1637; G06F 1/1652; G06F 1/1681
See application file for complete search history.

(56) References Cited

U.S. PATENT DOCUMENTS 9,348,450 B1 * 5/2016 Kim ..................... G06F 1/1681
10,551,880 B1 * 2/2020 Ai ....................... H04M 1/0216
(Continued)

FOREIGN PATENT DOCUMENTS

| CN | 104505003 A | 4/2015 |
|---|---|---|
| CN | 205978043 U | 2/2017 |
| CN | 207977988 U | 10/2018 |

*Primary Examiner* — Anthony Q Edwards
(74) *Attorney, Agent, or Firm* — Muncy, Geissler, Olds & Lowe, P.C.

(57) ABSTRACT

The invention provides a hinge of a mobile terminal having an inward-foldable flexible screen, which comprises a middle U-shaped cover, a left support frame, and a right support frame, and the left support frame, the right support frame and the U-shaped cover are rotatably connected; a foldable and unfoldable flexible screen support plate is connected to the left support frame, and the right support frame and the U-shaped cover, the flexible screen support plate is located inside the hinge; the flexible screen support plate is composed of a rotatable first left support plate, a second left support plate, a first right support plate and a second right support plate; the first left support plate is provided with a short lever arm that takes the shaft as a fulcrum to pull and support the second left support plate, and the first right support plate is provided with a short lever arm that takes the shaft as a fulcrum to pull and support the second right support plate. The invention also provides an
(Continued)

inward-foldable flexible screen mobile terminal using the above hinge. The invention has a simple structure, can make the middle mechanism of the hinge not to be exposed after the hinge is closed and provide a space for accommodating the bending portion of the flexible screen, and provides a better sense of operation experience.

5 Claims, 9 Drawing Sheets

(56) References Cited

U.S. PATENT DOCUMENTS

| | | | |
|---|---|---|---|
| 2014/0111954 A1* | 4/2014 | Lee | G06F 1/1652 361/749 |
| 2015/0233162 A1* | 8/2015 | Lee | G06F 1/1626 16/223 |
| 2016/0085265 A1* | 3/2016 | Park | G06F 1/1616 361/807 |

* cited by examiner

HINGE OF A MOBILE TERMINAL HAVING AN INWARD-FOLDABLE FLEXIBLE SCREEN AND A MOBILE TERMINAL HAVING AN INWARD-FOLDABLE FLEXIBLE SCREEN

TECHNICAL FIELD

The invention relates to a mobile terminal and its hinge.

BACKGROUND

Flexible screen is an emerging screen. For the mechanical structure of a flexible screen mobile terminal, what needs to be solved at present is how to implement support for the flexible screen to adapt to a certain bending characteristic of the flexible screen when the mobile terminal is closed, so that the flexible screen can be applied to the mobile terminal.

SUMMARY

The first technical problem to be solved by the present invention is to provide a hinge of a mobile terminal having an inward-foldable flexible screen, which has a simple structure and can be used as a hinge for a mobile terminal with a flexible screen inside. To this end, the present invention adopts the following technical solutions:

A hinge of a mobile terminal having an inward-foldable flexible screen, wherein it comprises a middle U-shaped cover, a left support frame, and a right support frame, which the left support frame, the right support frame, and the U-shaped cover are rotatably connected; a foldable and unfoldable flexible screen support plate is connected to the left support frame, the right support, and the U-shaped cover, and the flexible screen support plate is located inside the hinge to provide support for the flexible screen when the hinge is opened and flattened and provide space for storing the flexible parts of the flexible screen in folded state when the hinge is folded;

The flexible screen support plate is composed of a rotatable first left support plate, a second left support plate, a first right support plate and a second right support plate; the inner end of the first left support plate is rotatably connected with the outer end of the second left support plate, and the shaft is connected with the upper left side of the U-shaped cover; the inner end of the first right support plate is rotatably connected with the outer end of the second right support plate, and the shaft is connected with the upper right side of the U-shaped cover; the outer end of the first left support plate, the inner end of the second left support plate, the outer end of the first right support plate and the inner end of the second right support plate are all free ends; the second left support plate and the second right support plate rotate in the space provided by the U-shaped cover; the outer end of the first left support plate and the outer end of the first right support plate are movably connected with the left support frame and the right support frame respectively, and a guide mechanism for the activity is arranged between them.

The first left support plate and the second left support plate are movably connected to their shafts, and the first left support plate is provided with a short lever arm that takes the shaft as a fulcrum to pull and support the second left support plate; the first right support plate and the second right support plate are movably connected with their shafts; the first right support plate is provided with a short lever arm that takes the shaft as a fulcrum to pull and support the second right support plate.

Furthermore, the inner ends of the left support frame and the right support frame are respectively connected with the synchronous mechanism, so that the left support frame and the right support frame can rotate synchronously and reversely.

Furthermore, the guide mechanism comprises a guide groove provided on the left support frame and the right support frame, and a guide pin or guide shaft on the first left support plate and the first right support plate, and the guide grooves on the left support frame and the right support frame are symmetrically arranged.

Furthermore, a mounting cavity is provided at the end of the U-shaped cover, and a synchronization mechanism is installed in the mounting cavity.

Another technical problem to be solved by the present invention is to provide a mobile terminal having an inward-foldable flexible screen using the above hinge. To this end, the present invention adopts the following technical solution:

A mobile terminal having an inward-foldable flexible screen, wherein the mobile terminal is provided with any one of the above hinges, and the flexible screen is laid on the inner side of the mobile terminal.

As a result of adopting the technical solution of the present invention, the present invention has a simple structure can make the middle mechanism of the hinge not exposed after folding and provide space for accommodating the bending portion of the flexible screen, and provides a better sense of operation experience. When the hinge of the present invention is applied to mobile terminals such as mobile phones, e-books, laptops, etc., it can be used not only as the hinge, but also as a flexible screen supporting structure. When the mobile phone and the laptop are opened and closed, the flexible screen can be unfolded and folded freely, so that the flexible screens can be used in mobile terminals such as mobile phones, e-books, and laptops to enables the mobile terminals to realize large-screen display in a small volume.

DETAILED DESCRIPTION

Figure 1:
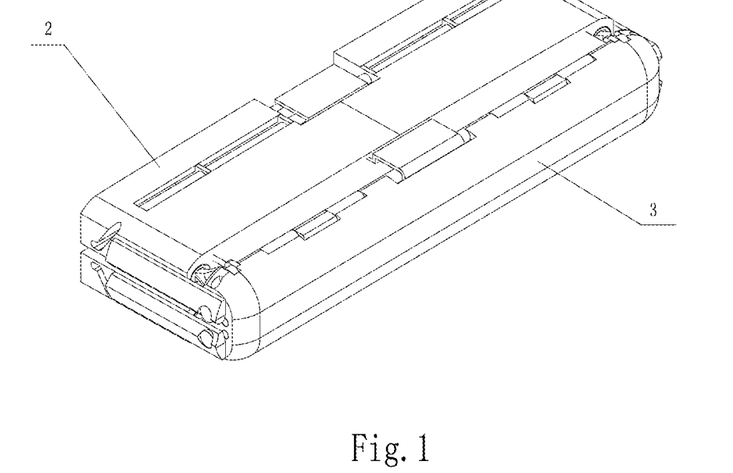
FIG. 1 is a schematic diagram of the hinge embodiment of the invention in the folded state.
Figure 2:
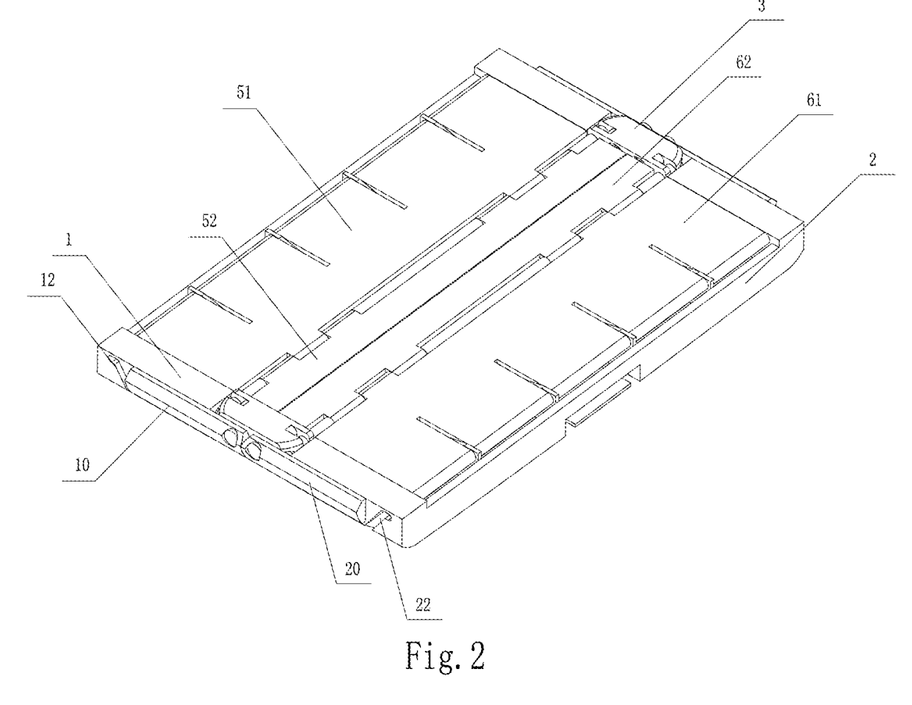
FIG. 2 is a schematic diagram of the hinge embodiment of the invention in the open and flattened state.
Figure 3:
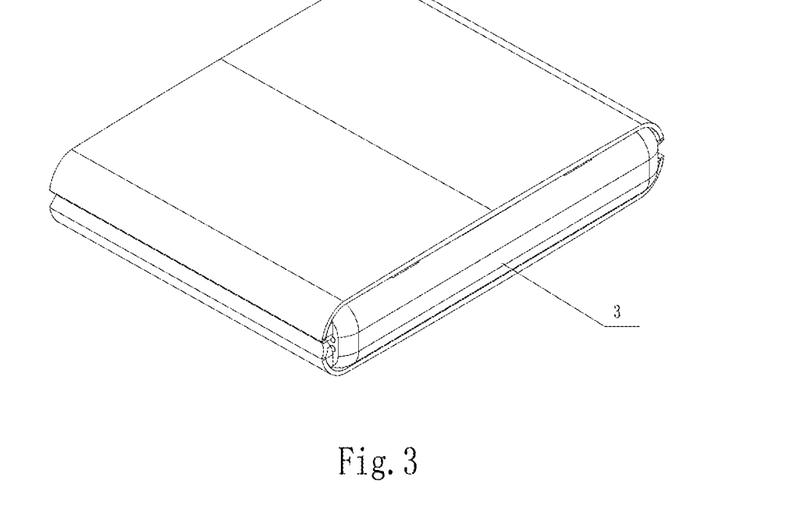
FIG. 3 is a schematic diagram of the mobile terminal embodiment of the invention in the folded state.
Figure 4:
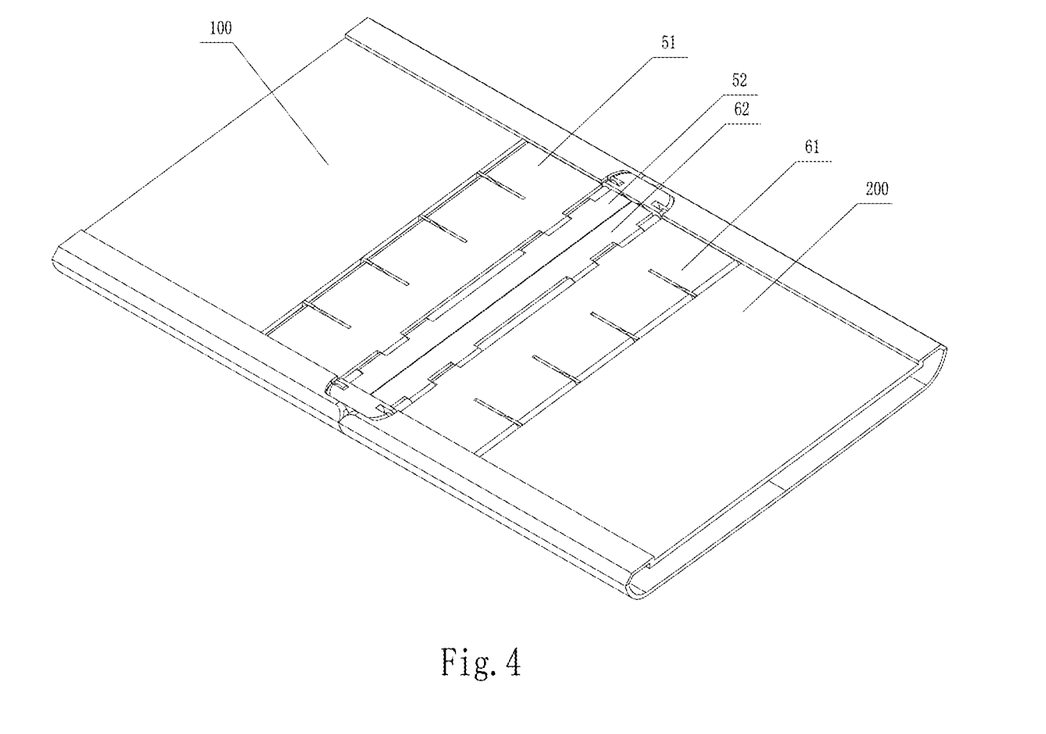
FIG. 4 is a schematic diagram of the mobile terminal embodiment of the invention in the open and flattened state.
Figure 5:
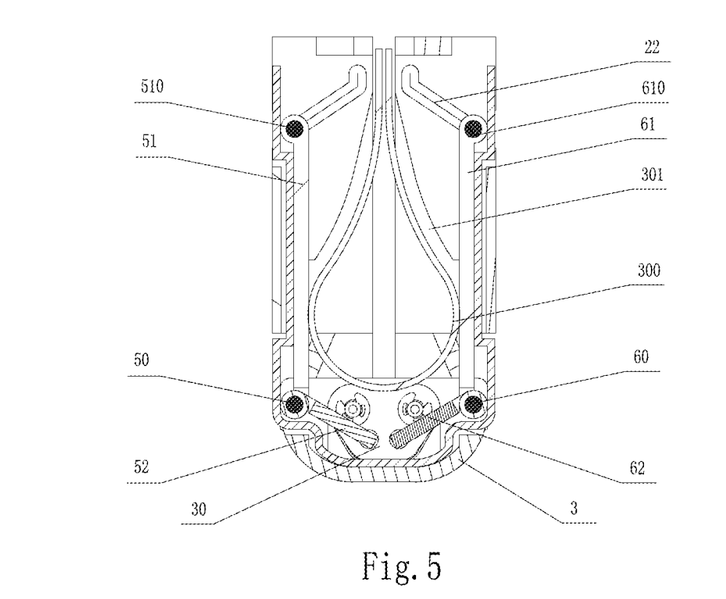
FIG. 5 is the first sectional view of the hinge embodiment of the invention in the folded state, showing that the flexible screen support plate is folded to provide space for accommodating the bending portion of the flexible screen.
Figure 6:
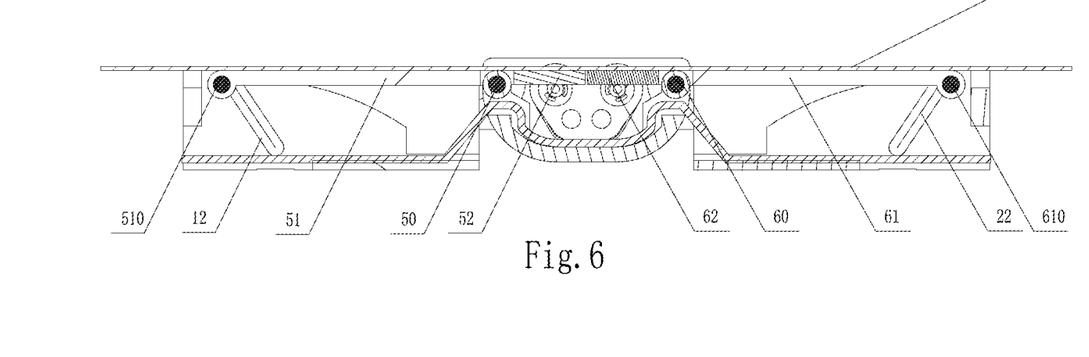
FIG. 6 is the first sectional view of the hinge embodiment of the invention in the open and flattened state, showing the open and flattened state of the flexible screen support plate.
Figure 7:
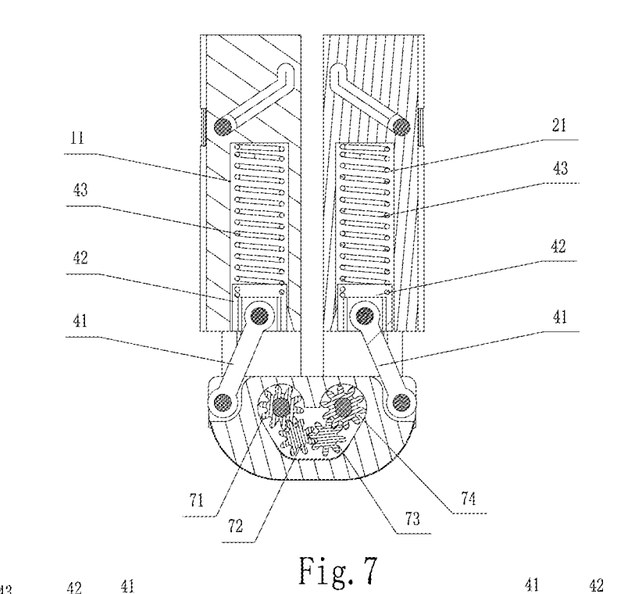
FIG. 7 is the second sectional view of the hinge embodiment of the invention in the folded state, showing the matching relationship of the torsion mechanism in this state.
Figure 8:
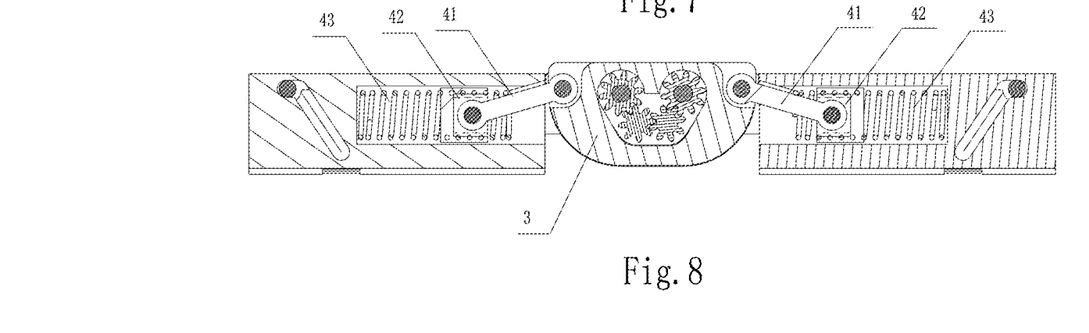
FIG. 8 is the second sectional view of the hinge embodiment of the invention in the open and flattened state, showing the matching relationship of the torsion mechanism in this state.
Figures 9, 10:
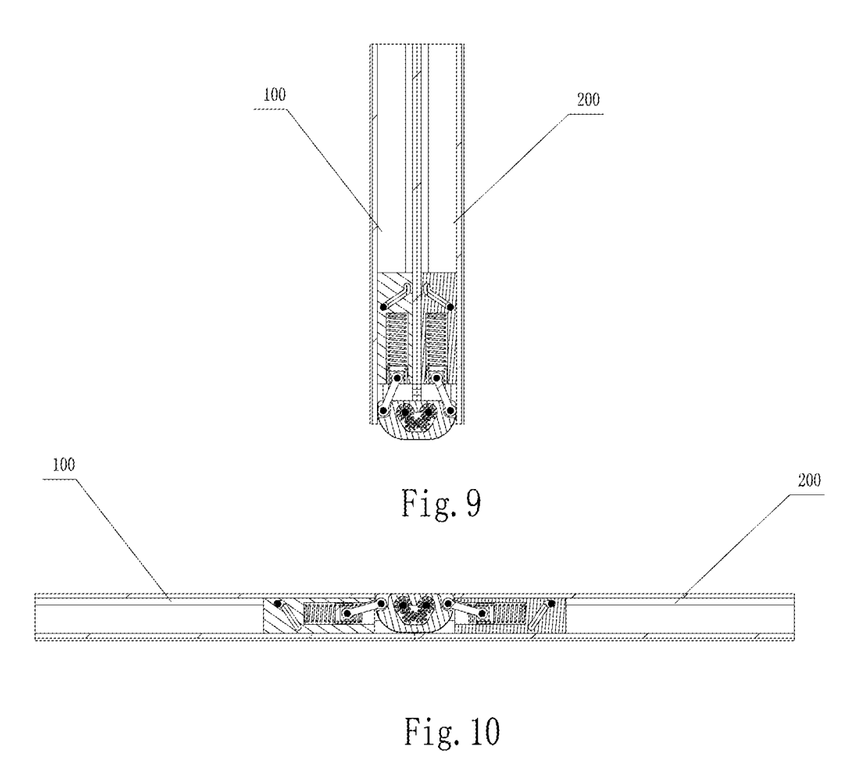
FIG. 9 is a sectional view of the mobile terminal embodiment of the invention in the state of FIG. 7.
FIG. 10 is a sectional view of the mobile terminal embodiment of the invention in the state of FIG. 7.
Figure 11:
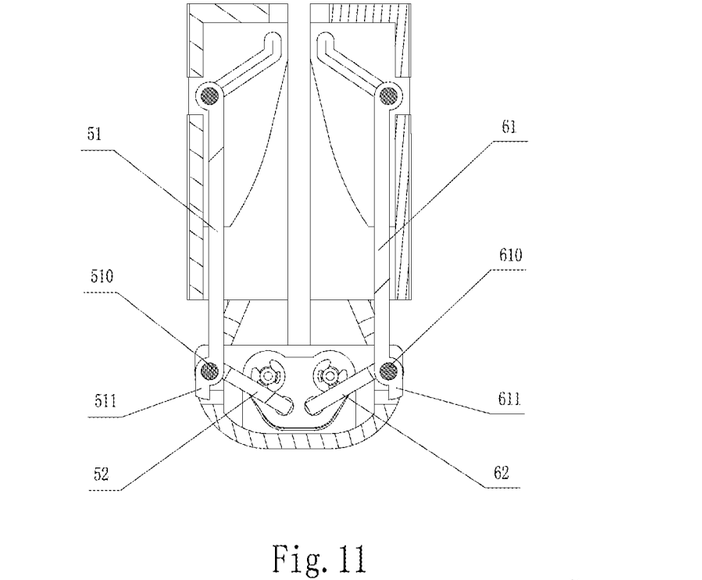
FIGS. 11, 12 and 13 are the three sectional views of the hinge embodiment of the invention in the folded state, the middle state and the open and flattened state respectively, showing the state change of the flexible screen support plate.
Figure 12:
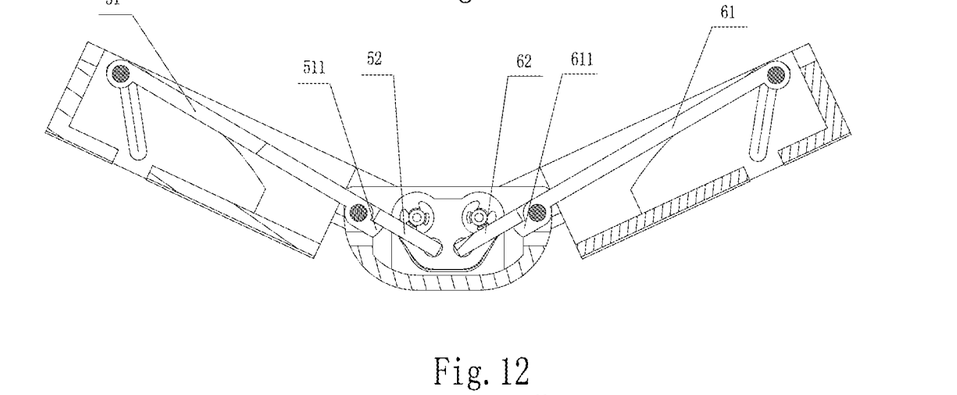
Figure 13:
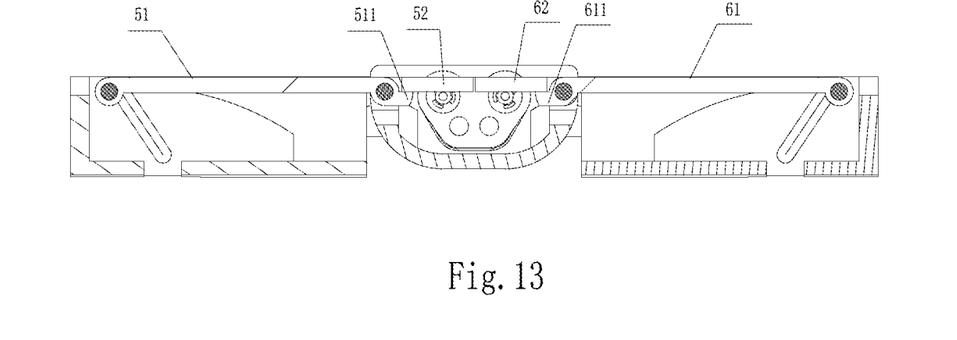
Figure 14:
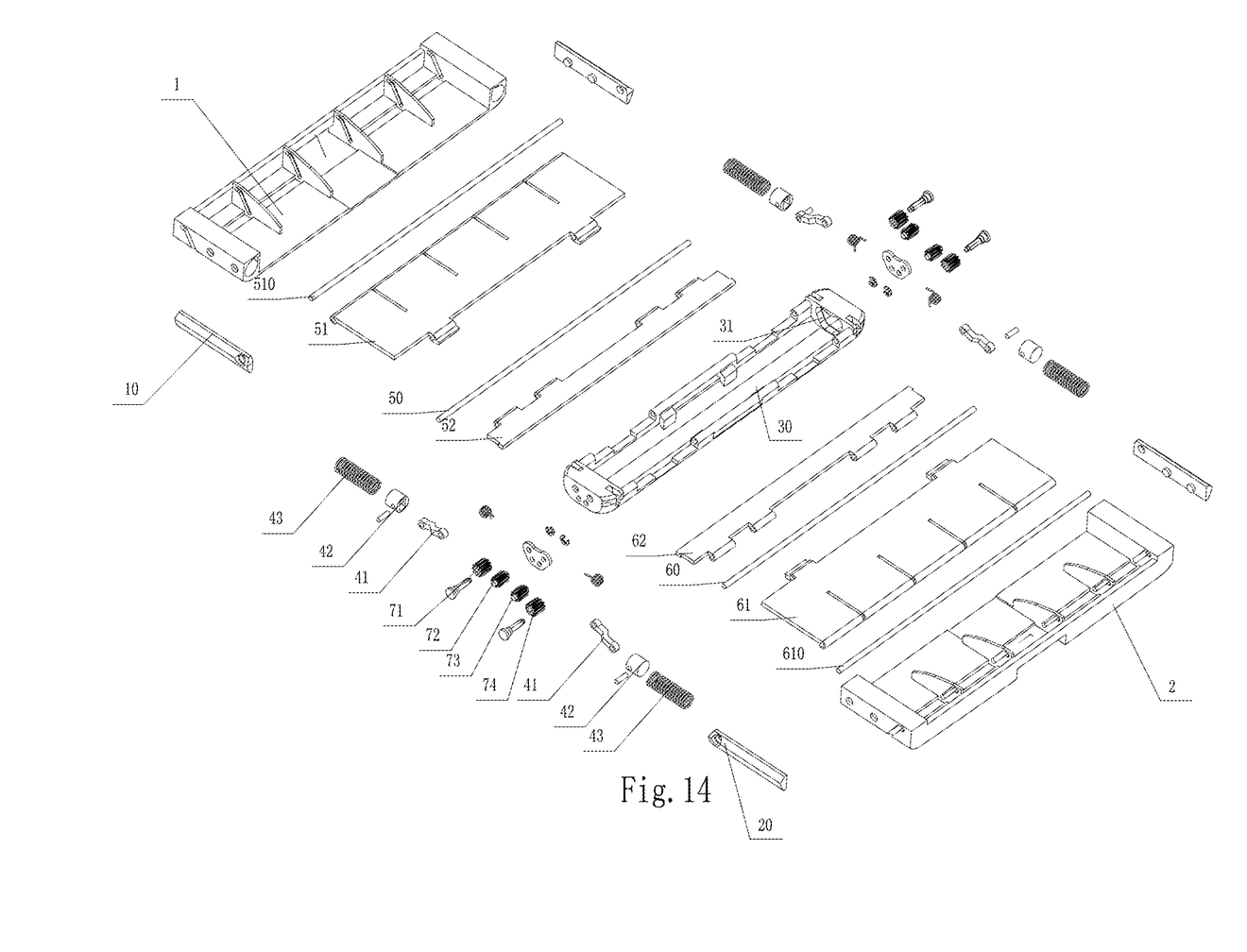
FIG. 14 is an exploded view of an embodiment of the hinge of the invention.
Figures 15, 16:
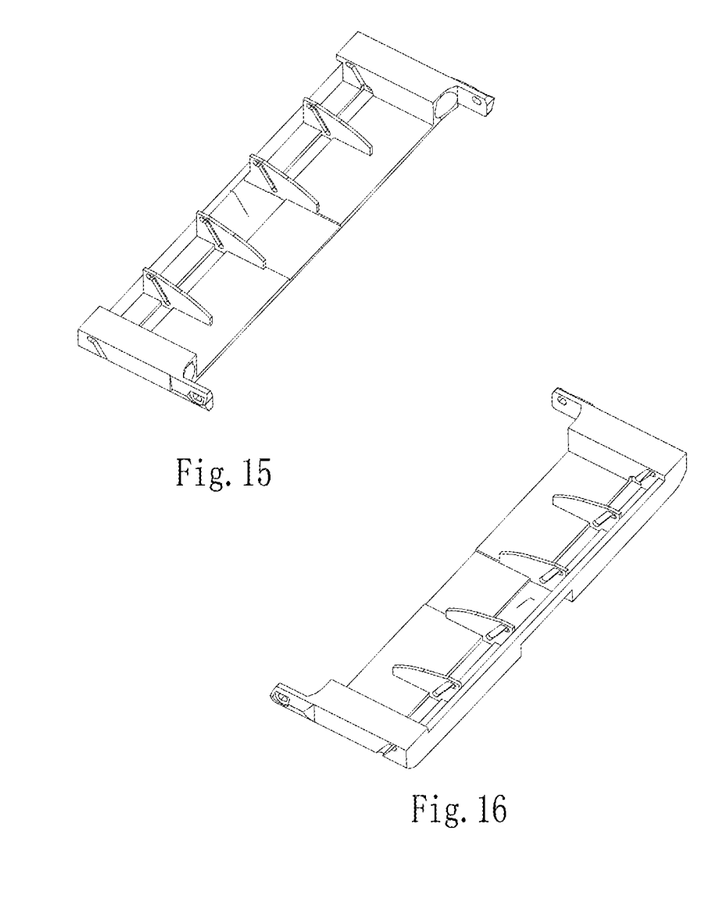
FIGS. 15 and 16 are schematic diagrams of another embodiment of the left support frame and the right support frame respectively.

Refer to the attached drawings. The semi-automatic hinge of a mobile terminal having an inward-foldable flexible screen provided by the present invention comprises a middle U-shaped cover 3, a left support frame 1, and a right support frame 2. As shown in FIGS. 1, 2, and 14, the left support frame 1 and the right support frame 2 both include connecting arms 10, 20, and are rotatably connected with the U-shaped cover 3 through the connecting arms 10, 20 and, as shown in FIGS. 15, 16, both the left support frame 1 and the connecting arm 10, and the right support frame 2 and the connecting arm 20 can be integral parts; the foldable and unfoldable flexible screen support plate is connected on the left support frame 1, the right support frame 2 and the U-shaped cover 3; the flexible screen support plate is located inside the hinge, provides support for the flexible screen 300 when the hinge is open and flattened, and which provides space 301 for accommodating the bending portion of the flexible screen when the hinge is folded.

The flexible screen support plate is composed of a rotatable first left support plate 51, a second left support plate 52, a first right support plate 61 and a second right support plate 62; the inner end of the first left support plate 51 is rotatably connected with the outer end of the second left support plate 52, and the shaft 50 is connected with the upper left side of the U-shaped cover 3; the inner end of the first right support plate 61 is rotatably connected with the outer end of the second right support plate 62, and the shaft 60 and the upper right side of the U-shaped cover 3 is connected; the outer end of the first left support plate 51, the inner end of the second left support plate 52, the outer end of the first right support plate 61 and the inner end of the second right support plate 62 are all free ends; the second left support plate 52 and the second right support plate 62 rotate in the space 30 provided by the U-shaped cover 3 with the shafts 50 and 60 as the axes, respectively. The outer end of the first left support plate 51 and the first right support plate 61 are movably connected with the left support frame 1 and the right support frame 2, respectively, and the movable guide mechanism is arranged between them. The guide mechanism are guide grooves 12 and 22 arranged on the left support frame 1 and the right support frame 2, and a guide pin or guide shaft 510 and 610 arranged on the first left support plate 51 and the first right support plate 61, and the guide grooves 12 and 22 on the left support frame 1 and the right support frame 2 are symmetrically arranged.

The first left support plate 51 and the second left support plate 52 are movably connected with their shaft 50, and the first left support plate 51 is provided with a short lever arm 511 which takes the shaft 50 as a fulcrum to pull and support the second left support plate 52; the first right support plate 61 and the second right support plate 62 are movably connected with their shaft 60, and the first right support plate 61 is provided with a short lever arm 611 which takes the shaft 60 as the fulcrum to pull and support the second right support plate 52.

Figure 17:
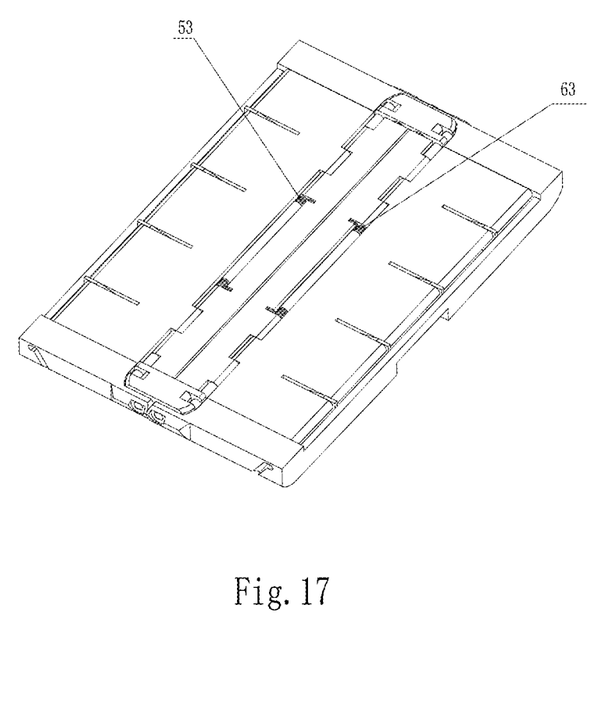
FIG. 17 is a schematic diagram of an embodiment of adding a torsion spring to the second left support plate and the second right support plate.
Figure 18:
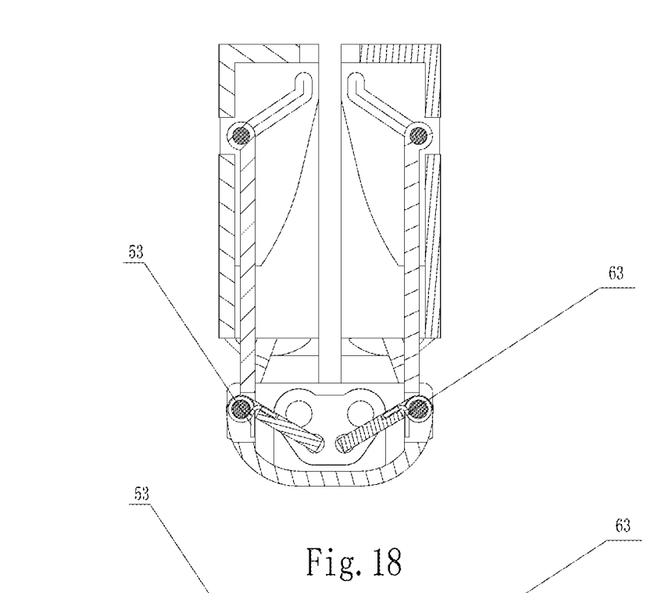
FIGS. 18 and 19 are sectional views of the hinge embodiment of the invention in folded state and unfolded state when torsion spring is added, respectively, showing the state change of flexible screen support plate.
Figure 19:
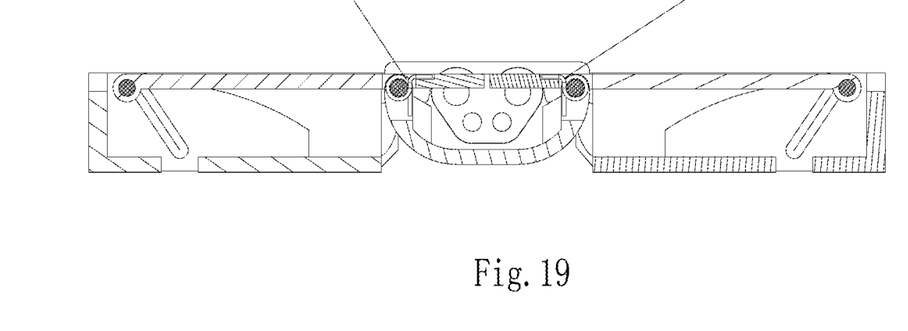

As shown in FIGS. 17, 18 and 19, torsion springs 53 and 63 can also be set on the shafts 50 and 60. One ends of the torsion springs are against the U-shaped cover 3, and the other ends are connected with the second left support plate 52 and the second right support plate 62. When the second left support plate 52 and the second right support plate 62 lose the support of the short arms 511 and 611, the torsion springs will play a assisting role, so that the second left support plate 52 and the second right support plate 62 can quickly move to the bottom of the U-shaped cover 3, which improves the sensitivity of the work, and the space 301 is rapidly formed.

In the process of hinge folding, the first left support plate 51 and the first right support plate 61 can rotate about the shafts 50 and 60. At the same time, the left support frame 1 and the right support frame 2 rotate to the top of the U-shaped cover 3, while the shaft 50 is on the upper left side of the U-shaped cover 3, and the shaft 60 is on the upper right side of the U-shaped cover 3, so that the space between the first left support plate 51 and the first right support plate 61 is enlarged, and the second left support plate 52 and the second right support plate 62 automatically rotate after losing support, thereby providing a larger space 301. In the process of hinge opening and flattening, since the short arms 511 and 611 support the second left support plate 52 and the second right support plate 62, the operation of opening and flattening will be very easy.

The inner ends of the left support frame 1 and the right support frame 2, that is, the connecting arms 10 and 20, are respectively connected with the synchronous mechanism, so that the left support frame 1 and the right support frame 2 can rotate synchronously and reversely. The synchronous mechanism may adopt a gear mechanism, which may comprise gears 71, 72, 73, 74 that are successively meshed. The parameters of the gear can be symmetrical or asymmetrical according to the action design requirements of the hinge opening. The gears 71 and 74 are respectively connected with connecting arms 10 and 20. The end of the U-shaped cover 3 is provided with a mounting cavity 31, and the synchronous mechanism is installed in the mounting cavity 31.

A torsion mechanism is arranged between the left support frame 1 and the U-shaped cover 3, and between the right support frame 2 and the U-shaped cover 3 to provide the semi-automatic opening and folding functions of the hinge. That is to say, manual operation is required at the beginning of opening or folding operation. At this time, the spring in the torsion mechanism is compressed to store energy. When the spring is opened or folded to a certain angle, the hinge will open or fold automatically after passing a critical state that the spring changes from storing energy to releasing energy.

The torsion mechanism comprises a rotatably torsion bar 41, a slider 42 and a spring 43, one end of the torsion bar 41 is rotatably connected with the U-shaped cover 3, and the other end is rotatably connected with the slider 42. The slider 42 is located in the holes 11 and 21 of the left support frame 1 or the right support frame 2 and is slidably connected with the left support frame 1 or the right support frame 2; the spring 43 is arranged between the slider 42 and the left support frame 1, and between the slider 42 and the right support frame 2. The torsion bar 41 is in an inclined state when the hinge is in the open and flattened state and folded state, and the slider 42 makes the spring 43 pass through a critical state by moving towards its extreme position in the direction of compressing the spring when the torsion bar changes from one inclined state to the other inclined state, which makes the hinge changes from manual to automatic (spring driven). As shown in the figure, when the hinge is opened and flattened, the torsion bar inclines to the direction away from the flexible screen (one inclined state), and in the process of the hinge moving from the open and flattened state to the folded state, the torsion bar will incline to the direction towards the flexible screen (another inclined state).

For the mobile terminal applying the hinge, taking a mobile phone as an example, the flexible screen 300 is laid on the inner side of the hinge and the inner side of the left main support plate 100 and the right main support plate 200 of the flexible screen. The left support frame 1 and the right support frame 2 can be respectively integrated with the left main support plate 100 and the right main support plate 200 of the flexible screen of the mobile terminal or are separate parts and fixed as an integral whole.

The above is only a specific embodiment of the invention, but the structural features of the invention are not limited to this. Any changes or modifications made by those skilled in the art in the field of the present invention are covered in the protection scope of the present invention.

The invention claimed is:

1. A hinge of a mobile terminal having an inward-foldable flexible screen, wherein the hinge comprises a middle U-shaped cover, a left support frame, and a right support frame, wherein the left support frame, the right support frame, and the U-shaped cover are rotatably connected; a foldable and unfoldable flexible screen support plate is connected to the left support frame, the right support, and the U-shaped cover, and the flexible screen support plate is located inside the hinge to provide support for the flexible screen when the hinge is opened and flattened and provide space for storing flexible parts of the flexible screen in a folded state when the hinge is folded;

the flexible screen support plate is composed of a rotatable first left support plate, a second left support plate, a first right support plate and a second right support plate; an inner end of the first left support plate is rotatably connected with an outer end of the second left support plate, and a first shaft is connected with an upper left side of the U-shaped cover; the inner end of the first right support plate is rotatably connected with an outer end of the second right support plate, and a second shaft is connected with an upper right side of the U-shaped cover; the outer end of the first left support plate, the inner end of the second left support plate, the outer end of the first right support plate and the inner end of the second right support plate are all free ends; the second left support plate and the second right support plate rotate in the space provided by the U-shaped cover; the outer end of the first left support plate and the outer end of the first right support plate are movably connected with the left support frame and the right support frame respectively, and a guide mechanism for movably connecting is arranged between them;

the first left support plate and the second left support plate are movably connected to the first shaft, and the first left support plate is provided with a short lever arm that takes the first shaft as a fulcrum to pull and support the second left support plate; the first right support plate and the second right support plate are movably connected with the second shaft, and the first right support plate is provided with a short lever arm that takes the second shaft as a fulcrum to pull and support the second right support plate.

2. The hinge of a mobile terminal having an inward-foldable flexible screen according to claim 1, wherein the inner ends of the left support frame and the right support frame are respectively connected with a synchronous mechanism, so that the left support frame and the right support frame can rotate synchronously and reversely.

3. The hinge of a mobile terminal having an inward-foldable flexible screen according to claim 1, wherein the guide mechanism comprises a guide groove provided on the left support frame and the right support frame, and a guide pin or guide shaft on the first left support plate and the first right support plate, and the guide grooves on the left support frame and the right support frame are symmetrically arranged.

4. The hinge of a mobile terminal having an inward-foldable flexible screen according to claim 2, wherein a mounting cavity is provided at the end of the U-shaped cover, and the synchronization mechanism is installed in the mounting cavity.

5. A mobile terminal having an inward-foldable flexible screen, wherein the mobile terminal is provided with the hinge according to claim 1, and the flexible screen is laid on the inner side of the mobile terminal.

* * * * *